_United States Patent Office_

3,361,648
Patented Jan. 2, 1968

3,361,648
METHOD AND APPARATUS FOR SEPARATING BRINE INTO POTABLE WATER AND CRYSTALLINE SALT
Lawrence R. Brown, La Plata, Md., and Alexander J. Reid, Feasterville, Pa., assignors to Publicker Industries, Inc., Philadelphia, Pa., a corporation of Pennsylvania
Filed Nov. 30, 1964, Ser. No. 414,818
10 Claims. (Cl. 203—11)

ABSTRACT OF THE DISCLOSURE

Salt and fresh water are produced from brine by subjecting the brine to temperatures and pressures above the critical temperature and pressure for water, thereby producing a separation of the brine into a salt rich phase and a salt lean phase. The salt lean phase is reduced in temperature and pressure to produce fresh water. The salt rich phase is flashed through a pressure reducing device to effect a second phase change, producing solid crystalline salt entrained in substantially pure water vapor. The solid salt and water vapor are separated and the separated water vapor is reduced in temperature to produce a second stream of fresh water. Incoming and outgoing streams are heat exchanged and work exchanged with one another to recover the heat and work involved in reaching operating temperatures and pressures as fully as possible.

This invention relates to a method and apparatus for converting brines into useful water and salt. The invention is especially concerned with a method and apparatus having the capability of producing crystalline salt directly as a co-product with the fresh water which is produced. Concentrated brines, which form a troublesome by-product of most brine treating methods of the prior art, are avoided in the practice of the present invention.

There are several advantages to be gained by eliminating concentrated brine as a by-product, and producing in its stead crystalline salt as a co-product. The salt has a wider range of uses than the brine and is easier to handle by reason of its smaller volume. In plants where the principal object is the production of fresh or potable water, a process which yields dry salt rather than brine represents the most efficient use of the dilute brine as a raw material.

In accordance with the present invention, advantage is taken of certain phase properties of salt-water systems. Thus, in one of its broader aspects, the invention contemplates a two-stage separation procedure. In the first stage, a concentrated brine phase is produced, together with a fresh water stream. The concentrated brine phase is subjected to a further or second treatment by being flashed through a pressure reducing device in the special manner described hereinafter to yield a salt stream and a second fresh water stream.

While the various phase properties involved will be discussed in greater detail later, it can be pointed out here that at certain interrelated temperatures and pressures above the critical temperature and pressure for pure water, a salt-water system exists in two phases, one of which is a salt-rich fluid and the other of which is a substantially salt-free fluid. When the phases co-exist in a vessel, they tend to separate gravimetrically, with the salt-free phase forming an upper layer of fluid and the salt-rich phase forming a lower layer.

The before-mentioned phase separation was observed and exploited in some ways by Von Platen in U.S. Patent No. 2,520,186. However, the present invention represents a distinct improvement upon Von Platen's teaching. One superiority of the present invention lies in the fact that the dense brine phase formed at high temperatures and pressures is not withdrawn from the high temperature and pressure environment as a by-product.

In addition, the present invention takes advantage of another set of phase properties of salt-water systems to effect a second, substantially complete phase separation of the salt-rich fluid into water vapor and micro-crystalline salt. This is done at temperatures and pressures which lie between the super-critical temperatures and pressures at which the salt-rich phase was originally formed, and ambient pressure and temperature. The work done in pressurizing the portion of the brine which was formed into the salt-rich fluid fraction during the first separating stage is thus utilized in part to establish the pressure conditions for the second phase separation. Stated differently, the separation of the salt-rich fluid into dry salt and recoverable water, is achieved without performance of an additional pressurizing step to create conditions where the separation will occur.

An important aspect of the present invention is that the exchange of heat between incoming feed brine and the product streams of salt-lean or substantially salt-free fluid is carried out under much more favorable conditions than the similar heat exchange operation of processes performed at sub-critical conditions. In the present invention advantage is taken of the fact that at the same temperature the heat contents of the incoming brine, and of the salt-lean or steam-like phase, are nearly the same. This permits much more complete exchange of heat between the phases or streams than is possible under sub-critical conditions where the salt-lean phase above its boiling point, for example, has a much higher heat content by reason of its heat of vaporization that does the incoming brine at the same temperature. Thus, under super-critical conditions only a small amount of externally supplied heat is required to accomplish the same goal as an externally furnished large heat of vaporization at sub-critical conditions. This reduced heat demand makes possible a significant reduction in the cost of producing potable water.

A typical operation in accordance with the invention is as follows. Dilute brine, of the kind found in various wells, is pumped into a separator under pressure. The brine is also heated, either as it is fed, or in the separator, or in both locations so that the temperature is raised to the desired level. The temperatures and pressures established in the separator are in excess of the critical pressure and temperature of pure water, and are at pre-selected values such that a phase separation occurs in the separator.

The substantially salt-free layer of fluid is withdrawn from the separator, and preferably work and heat exchanged with the incoming dilute brine. The salt-rich layer is also withdrawn from the separator. The flow rates of feed brine, salt-free fluid, and salt-rich fluid are adjusted so that the operation is performed continuously and the temperature and pressure required for the phase separation are maintained even though there is continuous flow of material into and out of the separator.

The salt-rich fluid phase is withdrawn from the separator and placed under conditions of temperature and pressure such that a further phase separation takes place. The pressure is substantially lower than the pressure maintained in the separator, and the temperature may be lower also, so long as it is above the boiling point of saturated brine at the reduced preselected pressure.

The transfer of the salt-rich fluid from the pressure and temperature conditions obtaining in the separator to the new pressure and temperature conditions can be done in several ways. According to the preferred method and apparatus, the salt-rich fluid is passed through a pressure reducing device such as an orifice or a nozzle leading into an expansion chamber. The use of such equipment makes continuous operation feasible. When a nozzle or orifice is employed, the apparatus is advantageously simplified, since it is possible to maintain the separator temperature and pressure conditions on the upstream side of the pressure reducer and the expansion chamber temperature and pressure conditions on the downstream side without the use of valves or other equipment.

From a thermodynamic viewpoint, the transfer of the salt-rich phase from separator conditions to expansion chamber conditions can be accomplished in several ways. The transfer can be done adiabatically, with the reliance being placed upon the sensible heat of the salt-rich fluid to supply the energy required in the phase separation. Another way to accomplish the transfer is isothermally, with the energy necessary for maintenance of the temperature being supplied from an outside source.

Under the preferred mode of operation, the phase separation which takes place when the salt-rich fluid passes through a pressure reducer, such as an orifice, into the expansion chamber is into a solid phase of microcrystalline salt and a fluid phase of substantially salt-free water. In order to obtain such a separation the temperature in the expanding fluid should be maintained above the boiling point of saturated brine at the pressure prevailing in the expansion chamber. The microcrystalline salt is entrained in the steam-like water phase, so that the two phases can be removed from the expansion chamber in a single stream. The mixture can then be separated in accordance with the techniques which have been employed heretofore to separate other mixtures of fine solids and gases. A separating technique which is quite suitable for the mixtures of salt and water vapor produced is that of cyclone separation. Such a separator can be operated continuously and two product streams, consisting of water vapor and dry salt, can be removed from the cyclone apparatus substantially continuously. The water vapor stream is desirably work and heat exchanged with a portion of the incoming brine which is being fed to the separator chamber. In this way a large measure of the energy which has been added to the water vapor during the process can be recovered.

From the foregoing description, it can be seen that fresh or potable water is produced in two product streams. According to the preferred method, the first being derived from the light salt-free phase formed in the separator, and the second being derived from the water vapor phase formed by pressure reduction of the salt-rich phase followed by separation of the water vapor from the crystalline salt. The only other product of the operation is the dry salt recovered from the bottom of the separator.

It is an important object of the present invention to improve high pressure systems for separating salt from water.

A further object of the invention is the provision of a method and apparatus capable of providing an economical supply of fresh water using dilute brine as a raw material.

Still another object of the present invention is to provide a brine-treating system producing two useful products: potable water and dry crystalline salt, while avoiding the production of other less desirable by-products.

Other objects and purposes together with the above objects can be better understood by considering the detailed description which follows together with the accompanying drawings in which.

Figure 1:
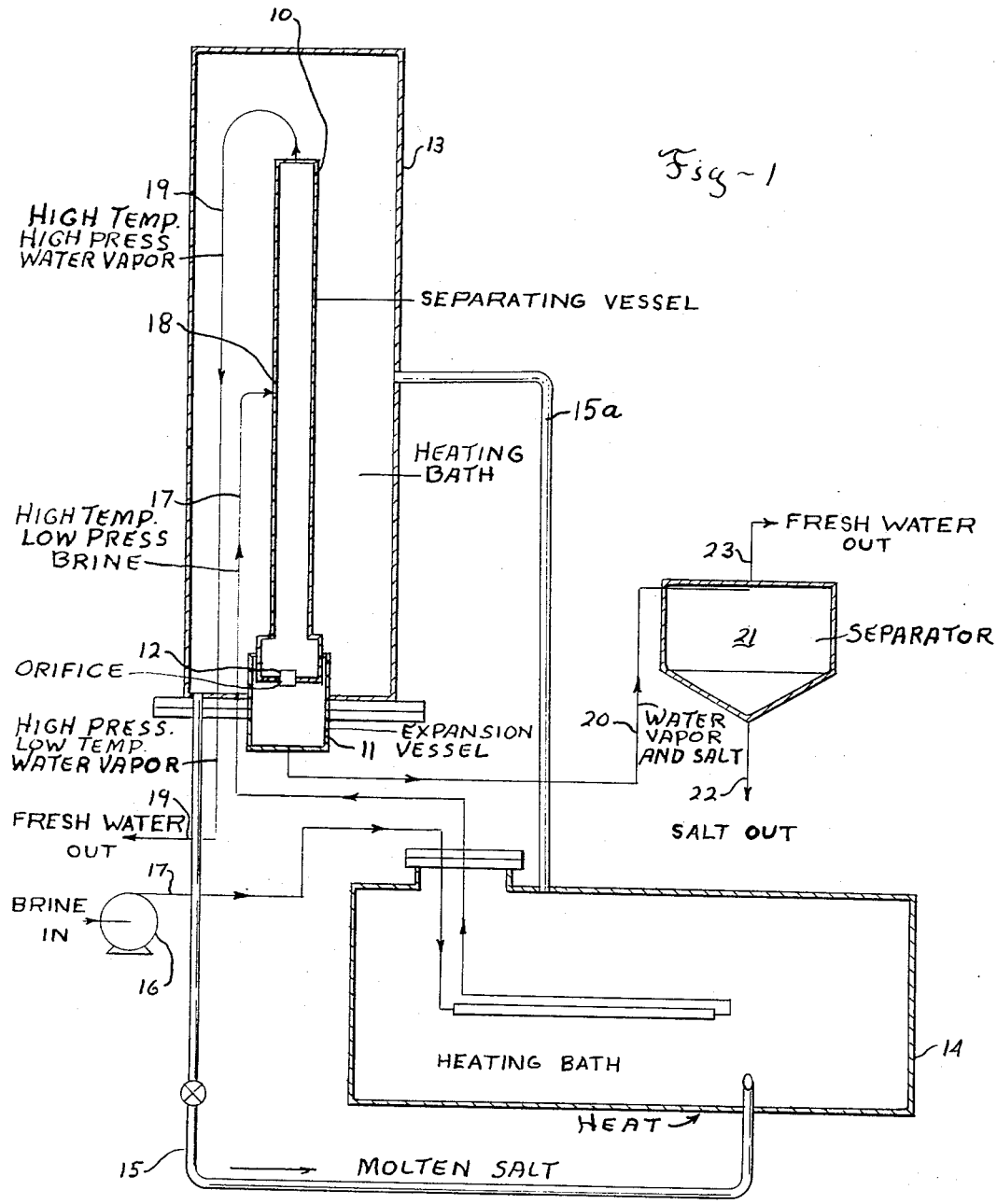
FIGURE 1 is a diagrammatic elevational view of an apparatus constructed in accordance with the invention.

In the apparatus shown in FIGURE 1 there is provided a generally cylindrical separating vessel 10, the interior of which may be regarded as a separating chamber. Mounted beneath the separating vessel 10 is an expansion vessel 11. Similarly, the interior of this vessel may be regarded as an expansion chamber.

The separator and the expansion chamber are connected by means of an orifice 12. In small scale equipment, the orifice can conveniently be formed by drilling a hole of pre-selected size in a sapphire. In larger equipment, utilizing a larger orifice, other high strength abrasion and corrosion resistant material may be employed. The size of the orifice is selected upon a number of considerations, including the pressures which it is desired to maintain in the separating chamber and in the expansion chamber, and the desired rate of flow of the salt-rich fluid through the orifice. A nozzle may be used in place of the orifice 12 as a pressure reducer.

In the embodiment of FIGURE 1, the orifice 12 comprises the entire flow path between the separator and the expansion chamber. However, if it is desired, the flow path can include a conduit in addition. If such an arrangement is employed, care should be taken to maintain the temperature of the fluid passing through the conduit, especially on the high pressure side of the orifice or nozzle. If the temperature is allowed to fall too low, salt tends to deposit from the salt-rich fluid passing through the conduit and there is thus a danger of clogging.

The separating vessel 10, the expansion chamber 11, and the orifice 12, are surrounded by a heating bath 13, and an additional heating bath 14 is provided for use as a pre-heater. The two heating baths are interconnected by conduits 15 and 15a. The heating baths form part of a fluid heat exchange system and are filled with molten salt.

A feed pump 16 is arranged to deliver incoming brine through input line 17 which passes through the pre-heater 14 to a point about midway of the height of the separating vessel 10. This input point is marked 18 on FIGURE 1. A light phase output line 19 extends from near the top of separator 10 to any convenient point outside the heating bath. A withdrawal line 20 runs from the expansion chamber 11 to a separator 21. The separator is desirably of the cyclone type having a bottom output line 22 for the removal of dry salt and a top output line 23 for the removal of salt-free fluid in the form of steam or water vapor.

Since the separator 10 is operated at pressures on the order of 5,000 p.s.i.a., it and the input line 17 should be strongly constructed so that they will withstand these pressures. The expansion chamber 11, and the separator 21 are operated at lower pressures in the neighborhood of 80 p.s.i.a.

Figure 2:
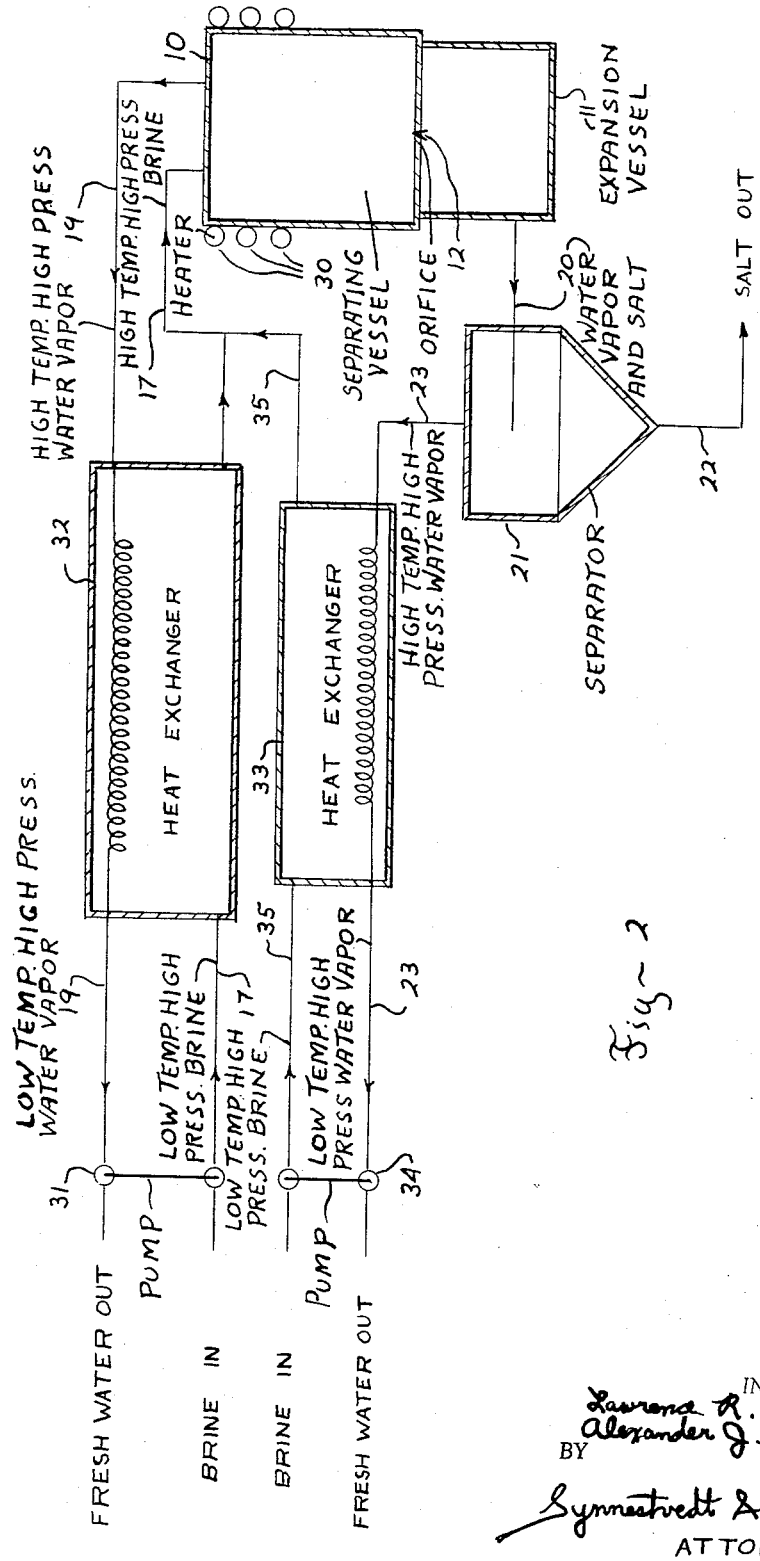
FIGURE 2 is a diagrammatic elevational view of another apparatus constructed in accordance with the invention incorporating additional features not shown in FIGURE 1.

Attention is now directed to FIGURE 2. The pieces of equipment in this figure which have functions similar to that of equipment appearing in FIGURE 1 are given the same reference characters. The apparatus shown in FIGURE 2 includes special arrangements for maximizing the recovery of heat and work from the outgoing streams. The separator 10 in FIGURE 2 is provided with heating coils 30 for maintaining the desired temperature within the separator. The expansion vessel 11 is again positioned beneath the separator and the two chambers are connected by nozzle 12. A cyclone separator 21 is provided and it is connected to the expansion chamber by means of line 20.

Input line 17 runs between work exchange pump 31 and the separator 10. In doing so it passes through a heat exchanger 32. Output line 19 is connected to the top of the separator vessel 10. It also passes through heat exchanger 32 and through work exchange pump 31. In this manner provision is made for transferring the sensible heat of the salt-free fluid leaving the separator 10 to the incoming brine and for transferring some of the work which has been done on the outflowing salt-free fluid in pressurizing it to the incoming low pressure brine.

An output line 23 runs from the upper part of the separator 21 through a secondary heat exchanger 33 and a secondary work exchange pump 34. An auxiliary brine input line 35 runs between secondary work exchange pump 34 and input line 17. In doing so, it passes through heat exchanger 33. In this way, provision is made for recovering much of the sensible heat content of the salt-free fluid passing through line 23 and for recovering a portion of the work done in pressurizing the salt-free fluid. Output line 22 runs from the bottom of cyclone separator 21 so that dry salt may be withdrawn from the cyclone unit.

Figure 3:
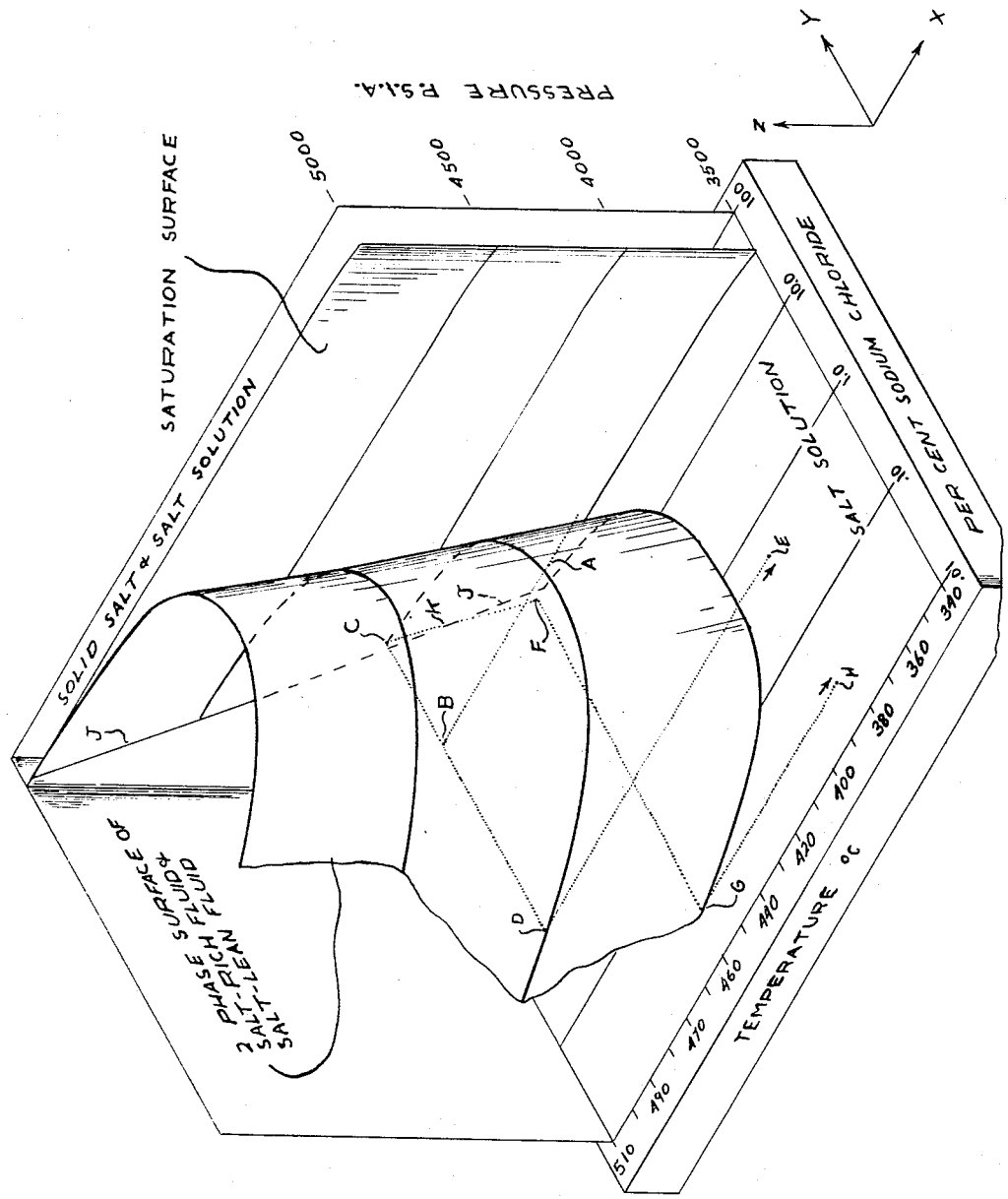
FIGURE 3 is a graph presenting some phase data for salt-water systems.

The phase relations which are exploited in the practice of the present invention may best be understood by considering FIGURE 3 which represents experimental data obtained from a study of salt-water systems under conditions of high temperature and pressure. The data of FIGURE 3 is represented on a three-dimensional phase diagram. In the X-Y plane of the diagram, temperature is plotted in centigrade degrees on a linear scale in the "X" direction. For convenience, lower values of temperature are plotted toward the right as viewed in FIGURE 3 and higher figures toward the left.

Percentage concentration of salt is plotted in the "Y" direction on a logarithmic scale, with the percentage values increasing toward the right as viewed in FIGURE 3.

The third variable, namely pressure, is plotted in the vertical or "Z" direction on FIGURE 3. Increasing values of pressure are plotted in the up direction as viewed in the figure. The bottom plane of the figure has a value of 3500 p.s.i.a.

On a three-dimensional plot, such as FIGURE 3, the boundaries between adjacent but different phase regions appear as surfaces. Two such surfaces appear in FIGURE 3. One is marked "saturation surface." It is the surface containing all of the isobaric saturation lines in the range of conditions shown on the diagram, and it was constructed by plotting four such saturation lines on the figure.

The other phase separation surface appearing on the diagram is marked "2-phase surface." This surface contains all of the isobaric phase boundary lines between the portion of the phase diagram where a salt-water system exists in one phase, namely salt solution, and the region of the diagram where a salt-water system exists as 2-phases, namely a salt-rich phase and a salt-lean phase, both of which are salt solutions. The 2-phase surface was developed in a manner similar to the development of the saturation surface. Thus, four selected isobars representing the phase boundary at the pressures involved were plotted to define the surface. One edge of the 2-phase surface is indicated as a wavy line, because sufficient data was not available to adequately define the shape of the surface in the region of high temperatures and very dilute concentrations. A study of the figure will reveal that the saturation surface and the 2-phase surface intersect along the line marked "J."

Also marked on the phase diagram are legends indicating the phases present under equilibrium conditions in various zones of the phase diagram. Thus, solid salt and salt solution are the equilibrium phases in the zone or region "behind" the saturation surface. In the portion of the diagram in front of the saturation surface, and to the right of the 2-phase surface, is the single phase region marked "salt solution." In the region behind and to the left of the 2-phase surface is the region of salt-rich fluid in equilibrium with salt-lean fluid. A trace of a process conducted according to the invention is shown in the diagram in dotted lines.

As outlined before, the process contemplates elevating a brine solution in temperature and pressure. Consider that this operation is being performed on a salt-water system having a total salt concentration of about 3%. A point such as point "A" on the dotted line in FIGURE 3 corresponds to an early stage in the process of raising the temperature and pressure on such a system. Suppose that the pressure at point "A" has been raised to about 4,000 p.s.i.a. From the location of point "A" on the diagram, one can conclude that the system at this point in the operation consists of one phase, namely, a solution of salt in water.

Suppose now that the temperature is raised but the pressure on the system is maintained at 4,000 p.s.i.a. The over-all composition of the system, of course, does not change. Point B on the dotted process line of FIGURE 3 represents the condition just described. However, a consideration of FIGURE 3 will show that the phase boundary surface in the vicinity of 4,000 p.s.i.a. has been crossed, and that for a system at point "B" there must exist two phases, namely, a solution or fluid rich in salt, and a solution or fluid very lean in salt, in fact, so lean as to be substantially salt free. The composition of the salt-rich phase at the temperature under consideration is indicated at point "C" where an isothermal line B–C at this temperature intercepts the two phase surface at 4,000 p.s.i.a. From the phase diagram it can be seen that this concentration is on the order of 50% and is considerably more concentrated than the incoming brine concentration. The concentration of the very lean or salt-free solution is shown at point "D" where the isothermal line for the temperature again crosses the 2-phase surface at 4,000 p.s.i.a. It can be seen that this concentration is on the order of .043% which is well within the potable range.

Inasmuch as the salt concentrations of the two phases are considerably different, the densities are correspondingly quite different, with the salt-rich phase being heavier than the salt-free phase. For this reason, when the two phases coexist in the same vessel, they are gravimetrically segregated into two different layers with a more or less distinct boundary between the two layers. By judicious placement of piping in a vessel containing the two phases arranged in layers, one can withdraw fluid consisting almost exclusively of one layer or the other.

The salt-free fluid having the composition represented by the point "D" can be converted into liquid water of the same composition by being separated from the salt-rich fluid and cooled down, for example toward and beyond the point E. This part of the operation can most conveniently be performed by withdrawing part of the salt-free layer from the separation chamber and cooling it in a separate chamber, such as a heat exchanger.

A consideration of FIGURE 3 will reveal that the 2-phase surface shown thereon is formed of a family of isobaric phase boundary lines, all of which have approximately the same shape. The 2-phase surface slopes generally downwardly and to the right as viewed in FIGURE 3; thus, isobars for lower pressures intercept the saturation surface at lower temperatures. The line "J" at which the 2-phase surface intercepts the saturation surface thus also slopes downwardly and to the right as viewed in FIGURE 3.

With these facts in mind suppose now that the pressure on the salt-rich fluid represented by point "C" is reduced, and that the temperature is allowed to fall also so that the processing conditions move along a line from "C" to "F." Suppose further that the pressure has been reduced to a value of about 3500 p.s.i.a. Note that the 2-phase surface intercepts the saturation surface at 3500 p.s.i.a. at a temperature slightly lower than that represented by the point "F." The portion of the process line C–F intercepts the 2-phase surface at the point K on line J where the saturation surface and the 2-phase surface coincide. As the process proceeds along line C–F below and to the left of line J a phase separation occurs. One phase is solid salt, and the other phase is a very lean salt solution having a concentration, for example, as indicated at the point "G," where the dotted constant temperature line F–G intercepts the 2-phase surface at 3500 p.s.i.a.

The phase separation of the salt-rich fluid into solid salt and salt-lean fluid will occur as just described even when the pressure is reduced to a value below the critical pressure for pure water, if the pressure reduction is performed so that at some point during the change in pressure and temperature conditions from the initial supercritical values to the sub-critical values, the pressure and temperature are such that the three-phase line "J" defining the junction of two-phase surface and the saturation surface is crossed in the super-critical region.

The temperature of the mixture of solid salt and salt-lean fluid, i.e., the temperature in the expansion chamber, may be below the critical temperature for pure water, but according to the preferred operation must nevertheless be maintained above the boiling point of saturated brine at the prevailing pressure to prevent re-dissolving the solid salt in the salt-lean phase.

Since the newly formed salt-lean phase is at a temperature above the boiling point of water at the pressure involved (and in this example above the critical temperature and pressure of pure water), the fluid may for practical purposes be regarded as water vapor or steam.

The solid salt and the water vapor phase may be separated, and as the salt-free water phase is cooled down, it is converted into potable water. The operation of cooling the salt-lean phase to produce potable water is represented by the dashed line extending from point "G" to point "H" and beyond. The salt concentration remains unchanged during this operation.

The process line sketched on FIGURE 3 forms a useful illustration of an important consideration in the practice of the present invention. The concentrated or salt-rich fluid which is subjected to phase separation into dry salt and water vapor, whether it is formed in accordance with the preferred high pressure phase separation of dilute brine procedure, or in some other manner, should have a salt concentration above a threshold level which depends somewhat on the operating conditions selected. In order to obtain the most effective phase separation, the composition of the salt-rich fluid represented by point "C" on FIGURE 3 should be so selected in relation to the general operating conditions that, upon expansion of that dense salt-rich fluid, it will cross the saturation surface at a higher temperature and pressure than the critical temperature and pressure for pure water.

The operation of the apparatus can now be outlined briefly in view of the foregoing comments concerning the phase relations involved. Consider first the apparatus of FIGURE 1. Incoming dilute brine enters at the pump 16 and is pumped through line 17 through the pre-heater 14 and is raised in temperature. It continues to flow through line 17 which passes through the heating bath 13 and into separator 10 at the point 18. By the time the feed brine has reached the point 18 it has been placed under the operating pressure of the separator by means of the pump 16 and has been brought to the operating temperature of the separator by the heating baths. The brine in the separator undergoes the first change of phase which has been discussed and is segregated into two layers. Fluid from the upper salt-free layer is drawn off through output line 19 and is delivered from the apparatus shown in FIGURE 1 to cooling equipment where it is condensed and reduced in pressure to form fresh water. The salt-rich phase in the separator 10 leaves the separating chamber through the orifice 12. As it is flashed into the expansion chamber 11, the second phase separation which has been discussed occurs, and a mixed stream of solid salt and water vapor passes through line 20 into the cyclone separator 21. The dry salt collects at the bottom of the cyclone, and is tapped off through line 22, while the water vapor phase passes out of the cyclone through line 23 which leads to cooling equipment not shown where the water vapor is reduced in temperature and pressure to yield a secondary stream of fresh water.

In the apparatus of FIGURE 2 the operation performed is similar to that of FIGURE 1, but special steps are taken to maximize the efficiency of the operation. For example, the incoming brine in line 17 is pressurized by a work exchange pump 31 which is driven in part by the outgoing fresh water in line 19, and in part by an outside source such as a prime mover. In this way, the work which has been done in pressurizing the material leaving the apparatus by line 19 is partly recovered. A part of the heat required to raise the temperature of the brine being fed through line 17 to the operating temperature of the separator is provided by heat transfer from the heat stored in the salt-free fluid leaving the system through line 19. This heat transfer is accomplished in heat exchanger 32.

The temperature and pressure in separator 10 are maintained at levels selected to effect the separation of the input brine into salt-rich and salt-lean phases. As mentioned above the salt-lean phase is removed through line 19. The salt-rich phase leaves the separator 10 through nozzle 12 and passes into the expansion chamber 11. Once again a phase separation takes place and the two-phase stream of solid salt and water vapor leaves the expansion chamber 11 through line 20. The two phases are separated in the cyclone 21, the dry salt being removed from the bottom through line 22 and the vapor leaving through line 23. The vapor is heat exchanged with an auxiliary stream of incoming brine in heat exchanger 33 and is work exchanged with the same auxiliary stream of incoming brine in work exchange pump 34. Pump 34, like pump 31 is provided with an outside source of power in addition to being driven in part by the fresh water in line 23.

Some preferences with respect to operating conditions can be given. It should first be noted that the process line sketched on FIGURE 3 was selected for clarity of illustration and does not necessarily represent a preferred set of operating conditions. The optimum conditions for an operation depend in part upon the characteristics of the feed brine. Considerable flexibility is possible, but it is preferred that the first phase separation be carried out at pressures and temperatures such that the salt concentration of the salt-lean phase is so low that the water recovered from its is potable, or at least suitable for the intended use. In this connection, it should be noted that water having a salt concentration as high as 0.05% is considered fit for human consumption, while water with a concentration of 0.16% is suitable for some agricultural purposes. Another factor bearing on the selection of operating conditions for the first phase separation is that it is desired to produce a salt-rich phase having a concentration high enough to constitute a suitable starting material for the second phase separation.

As explained above, the desired concentration depends in part upon the pressure at which the expansion chamber is operated.

In the continuous system shown in FIGURE 2, with a 3.0% feed brine solution, about 0.94 lbs. of fresh water are recovered through the output line 19 from the separation chamber for each lb. of brine fed into the system. About 0.06 lb. of salt-rich fluid are formed, and when this amount passes through the orifice or nozzle 12, it is separated into about 0.03 lb. of dry salt and about 0.03 lb. of water vapor, substantially all of which is recovered as fresh water from line 23. The figures just given are for a system in which the pressure in the separation vessel 10 is about 4,000 p.s.i.a. The separator temperature is about 460° C. The pressure in the expansion chamber is about 80 p.s.i.a. and the temperature maintained there is about 165° C.

We claim:

1. A method for producing crystalline salt and potable water from brine comprising delivering brine to and introducing it into a separation chamber, establishing a temperature and pressure in the brine in excess of the critical pressure and temperature of pure water and sufficient in relation to each other to effect a phase separation between a lower layer of salt-rich fluid and an upper layer of substantially salt-free fluid, withdrawing substantially salt-free fluid from the separation chamber, reducing the temperature and pressure on said withdrawn substantially salt-free fluid to produce a quantity of potable water, withdrawing salt-rich fluid from the separation chamber, reducing the pressure on said withdrawn salt-rich fluid to a preselected value while maintaining the temperature thereof at a level above the boiling point of saturated brine at said preselected pressure thereby effecting a phase separation of said withdrawn salt-rich fluid into crystallized salt and substantially salt-free fluid, separating said last-mentioned salt-free fluid and said salt, and reducing the temperature on said last mentioned salt-free fluid to produce a second quantity of potable water.

2. A method for producing crystalline salt and potable water from brine comprising continually delivering brine to and introducing it into a separation chamber, establishing a temperature and pressure in the brine in excess of the critical pressure and temperature of pure water and sufficient in relation to each other to effect a phase separation between a lower layer of salt-rich fluid and an upper layer of substantially salt-free fluid, continually withdrawing substantially salt-free fluid from the separation chamber, heat exchanging said withdrawn substantially salt-free fluid with a portion of the feed brine being delivered to said separation chamber, whereby to raise the temperature of said portion of the feed brine and cool said salt-free fluid, work exchanging said cooled pressurized salt-free fluid with cool low pressure incoming brine, whereby to reduce the pressure on said substantially salt-free fluid and increase the pressure on said incoming brine, continually withdrawing salt-rich fluid from the separation chamber, continually passing the withdrawn portion of said salt-rich fluid into an expansion chamber wherein the pressure is maintained at a preselected value below the value of the pressure in said separation chamber, and wherein the temperature is maintained at a temperature above the boiling point of saturated brine at said pre-selected pressure thereby effecting a phase separation in said expansion chamber of said withdrawn salt-rich fluid into crystallized salt and substantially salt-free fluid, continually withdrawing a mixed stream of said crystallized salt and substantially salt-free fluid from said expansion chamber, separating the salt and the salt-free fluid in said stream from each other, heat exchanging the separated salt-free fluid with a portion of incoming brine being delivered to the separation chamber, work exchanging said salt-free fluid with incoming brine, and withdrawing the separated crystalline salt.

3. A method for producing crystalline salt and potable water from brine comprising placing a quantity of brine under temperature and pressure conditions in excess of the critical pressure and temperature of pure water to effect a phase separation of the brine between a lower layer of salt-rich fluid and an upper layer of substantially salt-free fluid, recovering said upper layer of substantially salt-free fluid as potable water, further treating said lower layer of salt-rich fluid by placing it under a pre-selected temperature and pressure, said pressure being substantially less than the pressure placed on said brine, and said temperature being above the boiling point of saturated brine at said pressure to effect a phase separation of said salt-rich layer into crystalline water-free salt and a second salt-free fluid, and recovering said second salt-free fluid as potable water.

4. A method for producing crystalline salt and potable water from brine comprising feeding brine to and introducing it into a separation chamber, raising the pressure on said brine as it is being fed by exerting a pumping force on it, raising the temperature of said brine as it is being fed, the temperature and pressure in the separation chamber being raised to levels above the critical temperature and pressure for pure water, sufficient in relation to each other to thereby effect formation of a substantially salt-free phase and a salt-rich phase, withdrawing the substantially salt-free fluid phase forming in the separation chamber, and flowing the salt-rich fluid phase forming in the separation chamber through a pressure reducing device to a region of reduced pressure while maintaining the temperature thereon at a level above the boiling point of saturated brine at said reduced pressure, thereby separating the salt-rich fluid into solid salt and water vapor.

5. A method for producing crystalline salt and potable water from brine comprising subjecting the brine to a first separation operation yielding substantially salt-free water and a salt-rich fluid of concentration substantially greater than that of the brine taken for treatment, and separating the salt-rich fluid into solid salt and substantially salt-free fluid by subjecting the salt-rich fluid to a second separation operation comprising delivering the salt-rich fluid through an orifice from a region at a pressure and temperature above the critical pressure and temperature of pure water to a region at a reduced pressure and a reduced temperature but at a temperature above the boiling point of saturated brine at said reduced pressure.

6. A method according to claim 5 in which said first separation operation requires heating of the brine taken for treatment and in which the substantially salt-free fluid resulting from said second separation operation is heat exchanged with incoming brine being taken for treatment.

7. A method according to claim 5 in which said first separation operation requires pressurization of the brine taken for treatment and in which the substantially salt-free fluid resulting from said second separation operation is work exchanged with incoming brine being taken for treatment.

8. Apparatus for producing crystalline salt and potable water from brine comprising a pressure vessel for effecting separation of brine into a substantially salt-free fluid layer and a salt-rich fluid layer said layers being respectively above and below a separation boundary, a brine input line communicating with said vessel, a salt-free fluid output line communicating with said vessel above the separation boundary, an expansion vessel, means providing communication between said vessels and comprising a pressure reducing phase changing orifice the upstream side of which is presented to the pressure vessel below said separation boundary, means for establishing a temperature in the pressure vessel in excess of the critical temperature of pure water, and means for establishing a fluid pressure in the pressure vessel in excess of the critical pressure of pure water and substantially above that in the expansion vessel and providing for formation from salt-rich fluid passing through the orifice of a mixture of dry salt and substantially salt-free fluid.

9. Apparatus according to claim 8 and further including a mechanical separator receiving the mixture of dry salt and substantially salt-free fluid from the expansion chamber.

10. Apparatus according to claim 9 and further including work exchange means and heat exchange means connected with said brine input line, a salt-free fluid output line connected to said mechanical separator and to said work exchange means and heat exchange means and providing for delivery of said salt-free fluid from the mechanical separator through said work and heat exchange means.

References Cited

UNITED STATES PATENTS

| | | | |
|---|---|---|---|
| 1,204,716 | 11/1916 | Thorssell | 703—11 X |
| 2,330,221 | 9/1943 | Kermer | 159—45 X |
| 2,520,186 | 8/1950 | Von Platen | 159—2 X |
| 3,096,255 | 7/1963 | Redenbaugh | 203—92 X |
| 3,211,533 | 10/1965 | Witte | 23—273 |

FOREIGN PATENTS 667,359   6/1929   France.

OTHER REFERENCES

"Fresh Water From the Ocean" pages 143 through 151, 1954, Ronald Press N.Y. by C. B. Ellis.

NORMAN YUDKOFF, *Primary Examiner.*

J. SOFER, *Assistant Examiner.*